United States Patent [19]
Morimoto

[11] Patent Number: 5,748,351
[45] Date of Patent: May 5, 1998

[54] OPTICAL POWER DETECTOR, AND MULTI-LEVEL DIGITAL TRANSMISSION SYSTEM INCORPORATING THE SAME

[75] Inventor: Masahito Morimoto, Tokyo, Japan

[73] Assignee: The Furukawa Electric Co. Ltd., Tokyo, Japan

[21] Appl. No.: 606,859

[22] Filed: Feb. 26, 1996

[30] Foreign Application Priority Data

Feb. 27, 1995 [JP] Japan ................................. 7-063443

[51] Int. Cl.⁶ ........................................... H04B 10/158
[52] U.S. Cl. ........................... 359/193; 359/195; 359/181
[58] Field of Search ........................... 356/234, 323, 356/325; 359/193, 195, 128, 138, 139, 181; 250/559.03, 559.15

[56] References Cited

U.S. PATENT DOCUMENTS

| | | | |
|---|---|---|---|
| 5,239,399 | 8/1993 | Evans, Jr. et al. ................. | 359/128 |
| 5,245,199 | 9/1993 | Okitsu ................................. | 250/561 |
| 5,378,889 | 1/1995 | Lawrence ........................... | 250/227.16 |
| 5,625,479 | 4/1997 | Suzuki et al. ...................... | 359/135 |

OTHER PUBLICATIONS

Hoskens, R.C.P., et al, "Self-pulsating Lasers with Quantum Well Saturable Absorber", Appl. Phys. Lett. 67, No. 10, pp. 1343–1345, Sep. 4, 1995.

Loh, W. H., et al, "Passively Mode–Locked ER³⁺ Fiber Laser Using a Semiconductor Nonlinear Mirror", IEEE Photonics Technology Letters, vol. 5, No. 1, pp. 35–37, Jan. 1993.

Zirngibl, M., et al, "1.2 ps Pulses from Passively Mode–Locked Laser Diode Pumped Er–Doped Fibre Ring Laser", Electronics Letters, vol. 27, No. 19, pp. 1734–1735, Sep. 12, 1991.

*Primary Examiner*—Leslie Pascal
*Attorney, Agent, or Firm*—Robert G. Lev

[57] ABSTRACT

An optical power detector is provided which accurately detects the optical power of transmitted light and suffers almost no influence due to noise, and a multi-level digital transmission system which includes such an optical power detector. A beam of received light is incident into an entry end of a light fiber. A plurality of saturable absorbers are disposed in series along this light fiber, each having its own pair, differing in steps, of a first threshold value and a second threshold value which is greater than the first threshold value, and being substantially opaque to light of optical intensity below the first threshold value and substantially transparent to light of optical intensity above the second threshold value. A probe light source directs a beam of probe light to be incident upon each of the saturable absorbers in a direction crosswise to the light transmission path for the received light beam, when the received light beam is being transmitted along the light fiber to be incident upon the saturable absorbers in order. For each of the plurality of saturable absorbers, an avalanche photodiode (APD) is provided, which receives the probe light beam via its corresponding saturable absorber due to the received light beam passing through this saturable absorber, and which does not receive the probe light beam via this saturable absorber due to the received light beam being absorbed by this saturable absorber. And an optical power read out means detects whether or not probe light is received by each of the APDs which correspond to the saturable absorbers, thereby determines for each one of the saturable absorbers whether or not the received light beam has passed through it, and thus reads out the optical power of the received light beam.

8 Claims, 3 Drawing Sheets

OPTICAL POWER DETECTOR, AND MULTI-LEVEL DIGITAL TRANSMISSION SYSTEM INCORPORATING THE SAME

FIELD OF THE INVENTION

The present invention relates to an optical power detector which detects the optical power of light transmitted through an optical fiber or the like of an optical signal transmission system, and further relates to a multi-level digital transmission system which is equipped with such an optical power detector.

BACKGROUND OF THE INVENTION

The pulse modulation transmission method is widely used in the field of optical signal transmission. With this pulse modulation transmission method, as shown for example in FIG. 6 which relates to the prior art, a pulse modulated light signal from an optical source 18 is transmitted along an optical fiber 8 and is received by an optical signal receiver 19, which obtains the signal information contained in the pulse modulated light signal. In signal transmission by such a pulse modulation method, the information which is to be transmitted is first converted into a stream of binary digits, such as for example "0, 0, 1, 0, 1, 1, 0, 1", and then pulse modulation is applied by the optical source 18, which transmits a pulse modulated signal with an optical pulse being present in positions thereof which correspond to occurrences of the symbol "1" in this binary digit stream, and with no optical pulse being present in positions thereof which correspond to occurrences of the symbol "0" in the binary digit stream.

The optical signal receiver 19 receives the pulse modulated signal which arrives after transmission along the optical fiber 8 moment by moment, and detects the presence or absence of an optical pulse therein at predetermined time intervals; and the optical signal receiver 19 converts this pulse modulated light signal which it has received into digital form by outputting a "1" symbol when it detects the presence of an optical pulse and by outputting a "0" symbol when it detects the absence of any optical pulse, and thereby recreates the original stream of binary digits which were encoded in optical pulse form, thus recovering the information in the pulse modulated light signal.

Thus, since in the above described method of pulse modulated optical signal transmission the signal information which is required to be transmitted is conveyed by the presence or absence of optical pulses which respectively correspond to a "1" symbol or a "0" symbol. Any information which is to be transmitted is converted into numerical form and is expressed using binary notation. For this reason, it is necessary to send a long pattern of pulses when a large numerical value is to be transmitted, and hence it is difficult to send a large quantity of information efficiently. In this connection, recently, a so called multi-level digital signal transmission method has been theoretically proposed, in which a pulse modulated signal is transmitted whose pulses have different optical powers which correspond to three or more symbols, such as "0", "1", and "2" etc.. In this case, the optical signal receiver 19 will be required to convert the pulse modulated optical signal which it receives into a stream of three or more different symbols, which may be considered as digits in base-3, base-4, etc. notation.

With the multi-level digital signal transmission method of this proposal, an avalanche photodiode ("APD") which can resolve the level of the received optical signal into several levels has for example been contemplated for use as the optical signal receiver 19. Such an APD compares the optical power of the received optical signal with each of a stepped series of threshold levels, and in this manner it has been conceived of to read out multi-value symbols from the multi-level pulse modulated light signal by converting it into symbolic form using three or more symbols.

OBJECTS AND SUMMARY OF THE INVENTION

In such a multi-level digital signal transmission method, it is necessary to compare the optical power of the received light and certain threshold levels, in order to discriminate the level of the light which is received by the optical signal receiver 19 such as an APD into several steps. However, when light is transmitted along an optical transmission path like the optical fiber 8, it becomes contaminated by noise and the like, and mistakes may be made by the optical signal receiver 19 with regard to discriminating its optical power if undesirably this optical power is reduced by optical transmission losses. For this reason multi-level digital signal transmission methods such as described above have not been implemented in practice, since they are very susceptible to noise and transmission loss.

The present invention has been made with a view to solving the above described problems, and its first object is to propose an optical power detector which can accurately detect the optical power of each pulse in a transmitted pulse modulated light signal which consists of a series of pulses of a plurality of types which have different optical powers (i.e., an optical signal which can be converted into a stream of symbols of three or more types, when the no pulse state also is included), while suffering almost no influence due to noise. Further, a second object of the present invention is to propose a multi-level digital transmission system which can be realized in practice, including such an optical power detector.

In order to attain these objects, the present invention proposes an optical power detector, comprising: a light transmission path into an entry end of which a beam of received light is incident; a plurality of saturable absorbers, each of which has its own pair, differing in steps, of a first threshold value and a second threshold value which is greater than the first threshold value, and is substantially opaque to light of optical intensity below the first threshold value and substantially transparent to light of optical intensity above the second threshold value, disposed in series along the light transmission path; a probe light source for directing a beam of probe light to be incident upon each of the saturable absorbers in a direction crosswise to the light transmission path for the received light beam, when the received light beam is being transmitted along the light transmission path to be incident upon the saturable absorbers in order; for each of the plurality of saturable absorbers, a probe light reception section which receives its the probe light beam via the saturable absorber due to the received light beam passing through the saturable absorber, and which does not receive its the probe light beam via the saturable absorber due to the received light beam being absorbed by the saturable absorber; and an optical power read out means which detects whether or not probe light is received by each of the probe light reception sections which correspond to the saturable absorbers, thereby determines for each one of the plurality of saturable absorbers whether or not the received light beam has passed through it, and thus reads out the optical power of the received light beam.

Further, the multi-level digital transmission system according to the present invention comprises an optical fiber of length substantially equal to an integral multiple of the waveform deformation period of soliton pulses of order at least two, and an optical power detector according to the present invention as described above, connected to an end of this optical fiber.

According to the construction of the present invention as described above, the probe light beams from the probe light source are incident each upon its corresponding one of the plurality of saturable absorbers which are disposed in series along the light transmission path and have their threshold values differing in steps, crosswise to the received light beam which is transmitted along the light transmission path and is incident upon the saturable absorbers in order. When the intensity of the transmitted light beam is greater than the second threshold value of any one of the saturable absorbers, it passes through that saturable absorber and renders it substantially transparent, so that the corresponding beam of probe light also passes through that saturable absorber and is thus received by the corresponding probe light reception section; while, when the intensity of the transmitted light beam is less than the first threshold value of any one of the saturable absorbers, it is absorbed by that saturable absorber and leaves it substantially opaque, so that the corresponding beam of probe light also is intercepted by that saturable absorber and is thus not received by the corresponding probe light reception section. And the optical power read out means detects whether or not probe light is received by each of the probe light reception sections which correspond to the saturable absorbers, thereby determines for each one of the plurality of saturable absorbers whether or not the received light beam has passed through it, and reads out the optical power of the received light beam from the relationship between this determined information and the threshold levels possessed by each of the saturable absorbers.

According to the present invention, when the transmitted light beam is incident upon the saturable absorbers in order, the probe light beams are also directed to be incident thereupon crosswise to the transmitted light beam, and when the transmitted light beam passes through any one of the saturable absorbers the corresponding probe light beam is also transmitted therethrough crosswise so as to be incident upon the corresponding one of the probe light reception sections; while when the transmitted light beam is intercepted by any one of the saturable absorbers the corresponding probe light beam is also intercepted thereby so as not to be incident upon the corresponding one of the probe light reception sections. Accordingly, it is possible to detect the optical intensity of the transmitted light beam by determining which of the saturable absorbers is allowing it to pass. For this reason, this invention differs from prior art light receivers which detect the optical intensity by providing a threshold level for the transmitted light beam which is received, and almost no influence is received from noise and the like. Further, the optical intensity is read out digitally, and the detection of the optical intensity can be performed accurately and quickly.

Accordingly, if the optical power detector according to the present invention is utilized in an optical signal transmission system or the like which transmits a number of optical pulses of differing optical intensity by time division multiplexing, like a soliton pulse modulated optical signal etc. which consists of higher order soliton pulses, the optical pulses which are transmitted are instantaneously digitized, and the optical intensity of each optical pulse is accurately read out in real time. By doing this, the information in the transmitted pulse signal can be read out quickly and moreover accurately.

Thus it becomes possible to construct an optical signal transmission system which can be suitably applied in practice, by including the optical power detector according to the present invention in the optical transmission path.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which.

DETAILED DESCRIPTION OF THE PREFERRED EMBODIMENT

Figure 1:
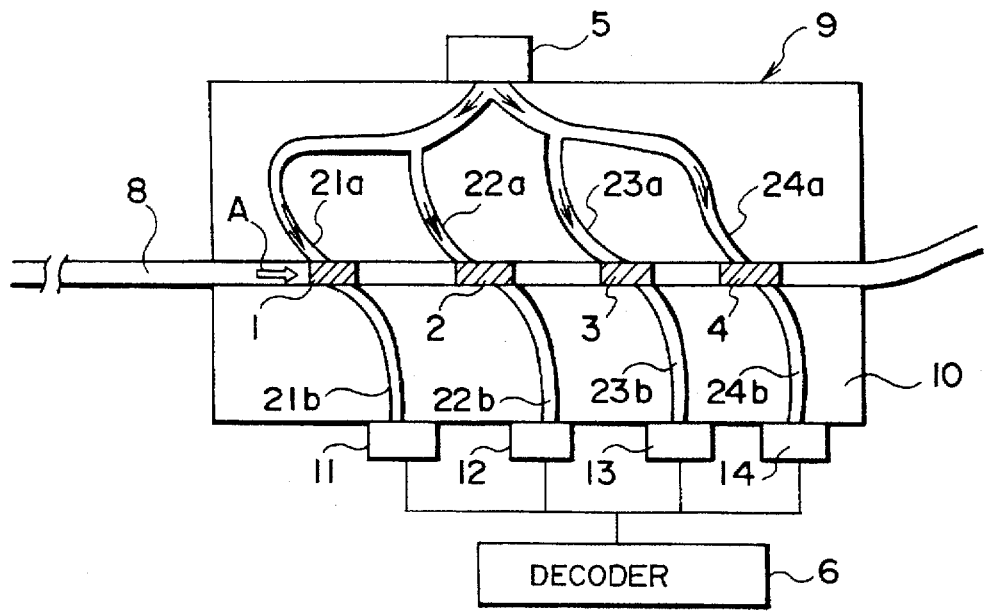
FIG. 1 is a structural view showing essential elements of the preferred embodiment of the optical power detector of the present invention.

The preferred embodiment of the present invention will now be explained with reference to the figures. FIG. 1 is a structural view showing essential elements of an optical power switch 9 which is the preferred embodiment of an optical power detector which is one aspect of the present invention, along with an optical fiber 8 of a signal transmission system which is the preferred embodiment of another aspect of the present invention. In the same figure there are shown a plurality (in the figure, four) of saturable absorbers 1, 2, 3, and 4 which are connected in series to the optical fiber 8. These saturable absorbers 1, 2, 3, and 4 are constituted so as to absorb signal transmission light of intensity below a first threshold value, and so as to allow the passage of signal transmission light of intensity greater than a second threshold value which is greater than this first threshold value, and they are individually endowed with threshold values which differ in steps.

There are two types of saturable absorber which have recently been used: a first type of cell of semiconductor superlattice construction in which layers of $Al_xGa_{1-x}As$ and $GaAs$ semiconductor materials are mutually superimposed, and a second type of cell of semiconductor superlattice construction in which layers of $In_xGa_{1-x}As$ and $In_xAl_{1-x}As$ are mutually superimposed.

By using a superlattice construction, the wave functions of the valence band, of the conducting band electrons, and of the holes are quantized, so that the optical characteristics of the superlattice are different from those of normal bulk form semiconductors, and it exhibits a step type optical absorption spectrum. Simply, these superlattice constructions exhibit the phenomenon that the index of absorption changes very steeply according to wavelength.

However, change of the index of absorption according to wavelength is not required in order to function as a saturable absorber for the purposes of the present invention; but it is required that the index of absorption should change according to optical intensity.

According to the superlattice construction, the electrons and the holes form bound states and excitons appear, but if the optical absorption of these excitons is increased and decreased, change of the index of absorption according to intensity occurs.

Recently, when forming superlattices of quantum well layer construction, at least one impurity has been chosen and added from Group IV (C, Si, etc.), Group II (Mg, Zn, Cd, etc.), and Group VI (Se, S, Te, etc.), in order to make the action of these excitons prominent and so as to make the change in the index of absorption according to intensity very steep. When this is done, very steep change of the index of absorption according to intensity appears, due to the absorption of the excitons which appear in the superlattice construction.

Figure 2:
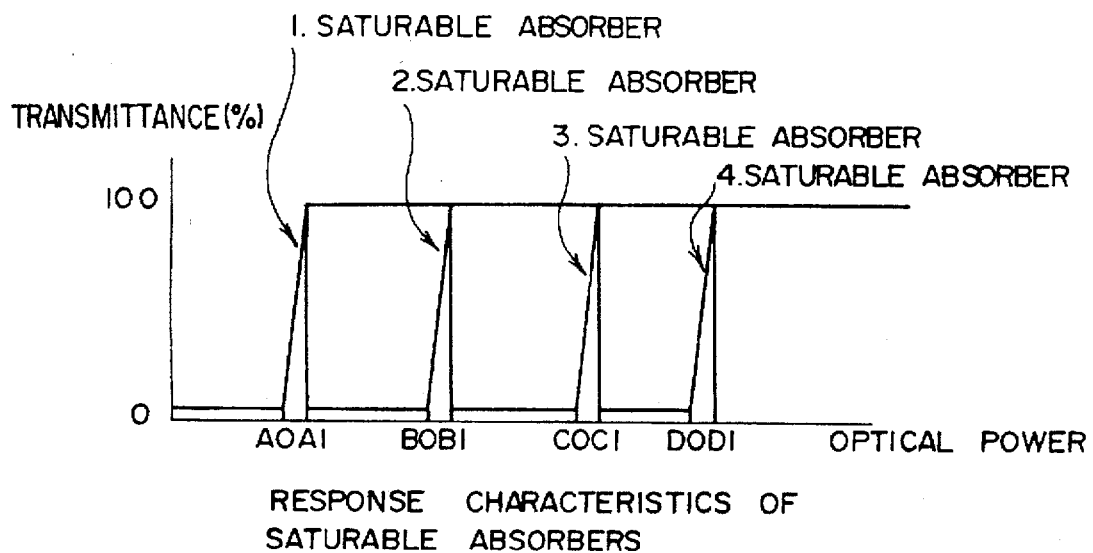
FIG. 2 is a graph showing the response characteristics according to light intensity of four saturable absorbers 1 through 4 of this preferred embodiment.

By varying the amounts of these impurities, superlattice cells may be manufactured whose response characteristics for rise of the change of index of absorption according to the light intensity are shifted as shown in FIG. 2.

In the case of a cell which is made of AlxGa1-xAs and GaAs, the value x=0.3 is suitable for the composition ratio, while in the case of a cell which is made of InxGa1-xAs and InxAl1-xAs the value x=0.53 is suitable; but these values are only exemplary ones employed for cells which have recently been produced, and it is clear that the composition ratio should not be limited to the above described values. Further, although the above described semiconductor substances have been used as materials for the cells, again these are only exemplary substances which have been used for recently produced cells, and the substances actually used are not to be considered as being limited to these ones.

In FIG. 2 there are shown the response characteristics of these saturable absorbers 1 through 4, i.e. the relation of their optical transmittances to the optical power. As shown in this figure, for example the saturable absorber 1 is constituted so as to absorb (be opaque to) substantially 100% of light of intensity less than a first threshold value A0 (for example 1 mW), while it transmits (is transparent to) substantially 100% of light of intensity greater than a second threshold value A1 (for example 5 mW) which is greater than the first threshold value A0. In the same manner, each of the other saturable absorbers 2, 3, and 4 is constituted so as to have individual first and second threshold values, exemplarily respectively (B0, B1)=(20 mW, 25 mW), (C0, C1)=(60 mW, 65 mW), and (D0, D1)=(130 mW, 135 mW); and so as to absorb substantially 100% of light of intensity less than its first threshold value, while it is transparent to substantially 100% of light of intensity greater than its second threshold value.

As shown in FIG. 1, a wave conduction chip 10 is formed around the region in which the saturable absorbers 1, 2, 3, and 4 are disposed, and in this chip 10 there are formed four light inwards conduction paths 21a through 24a for transmitting beams of probe light inwards to each of the saturable absorbers 1, 2, 3, and 4 respectively, and also four corresponding respective light onwards conduction paths 21b through 24b for transmitting these beams of probe light onwards from the saturable absorbers 1, 2, 3, and 4 respectively. The incident (upstream) ends of the light conduction paths 21a through 24a for leading the probe light beams inwards are connected together and a probe light source 5 is provided for directing probe light thereonto, this probe light being divided and then transmitted as four probe light beams by the light conduction paths 21a through 24a inwards to each of the saturable absorbers 1, 2, 3, and 4, respectively. Four individual avalanche photodiodes (hereinafter termed "APD"s) 11 through 14 are provided at the light emitting (downstream) ends of the probe light onwards conduction paths 21b through 24b respectively, so as to receive the probe light beams which have passed through the saturable absorbers 1, 2, 3, and 4 respectively.

Now, when pulse modulated signal light (light for signal transmission) is transmitted down the optical fiber 8 and is incident upon the saturable absorbers 1 through 4 in order, the probe light from the probe light source 5 passes down the probe light inwards conduction paths 21a through 24a and is incident upon each of the saturable absorbers 1 through 4 so as to cross this pulse modulated signal light therein. And, considering each of the saturable absorbers 1 through 4 individually, if this saturable absorber is saturated by the pulse modulated signal light so as to become substantially transparent and so as to transmit it onwards (rightwards in the figure), it also will allow the probe light from the probe light source 5 to pass through it crosswise (downwards in the figure), so that the corresponding one of the APDs 11 through 14 will receive this probe light; while, on the other hand, if this saturable absorber is not saturated by the pulse modulated signal light so as to remain substantially opaque and absorb it and so as to prevent its onwards transmission, it also will absorb and intercept the probe light from the probe light source 5 and will prevent its onwards transmission, so that the corresponding one of the APDs 11 through 14 will not receive this probe light.

To express this in another manner, for example, if the optical power P of a pulse of this pulse modulated signal light is greater than A1 and is less than B0 (A1<P<B0), then, when this pulse of the pulse modulated signal light is incident upon the saturable absorber 1, it will saturate the saturable absorber 1 (because its optical power P is greater than the second threshold value A1 thereof) and will therefore make it substantially transparent, and thus this signal light will be transmitted through the saturable absorber 1 onwards towards the saturable absorber 2. At this time, the probe light from the probe light source 5 which passes via the probe light inwards conduction path 21a and is incident upon the saturable absorber 1 will pass through the saturable absorber 1 which now is substantially transparent, and accordingly will be transmitted down the probe light onwards conduction path 21b, and will be incident upon the APD 11.

On the other hand, when this pulse of the pulse modulated signal light is further incident upon the saturable absorber 2, it will not saturate this saturable absorber 2 (because its optical power P is less than the first threshold value B0 thereof) and will therefore leave it substantially opaque, and thus the signal light will be intercepted by the saturable absorber 2 and will not be transmitted therethrough onwards towards the saturable absorbers 3 and 4. At this time, the probe light from the probe light source 5 which passes via the probe light inwards conduction path 22a and is incident upon the saturable absorber 2 will not pass through this saturable absorber 2 which remains substantially opaque, and accordingly will not be transmitted via the probe light onwards conduction path 22b, and will not be incident upon the APD 12. In the same manner as explained above, no probe light from the probe light source 5 will be incident upon the other two APDs 13 and 14 either, because the other two saturable absorbers 3 and 4 will not receive the pulse modulated signal light at all since it is substantially completely intercepted by the saturable absorber 2, and therefore they will remain unsaturated and substantially opaque, thus intercepting their own corresponding beams of probe light.

A decoder 6 is connected to each of the APDs 11 through 14, and this decoder 6 is so constituted as to detect whether or not probe light is being received by each of the APDs 11 through 14 via its corresponding one of the saturable absorbers 1 through 4. By doing this, it is possible to determine from the decoder 6 whether or not this pulse of pulse modulated signal light is being transmitted through each of the saturable absorbers 1, 2, 3, and 4, and, by relating this information to the response characteristics of the saturable absorbers 1 through 4, it is possible to read out the intensity of this pulse of pulse modulated signal light.

The optical power switch 9 of this preferred embodiment is constituted as described above, and, as shown in FIG. 3, is provided at the output end of the optical fiber 8. At the input end of the optical fiber 8 (the end upon which the pulse modulated signal light is incident) there is provided a fiber ring laser 16, which serves as a light source for generating the pulse modulated signal light. This fiber ring laser 16 is constructed so as to generate soliton pulses around a central wavelength of 1.552 µm as light pulses, and is arranged so as to direct 1-soliton pulses, 2-soliton pulses, 3-soliton pulses, or 4-soliton pulses to be incident upon the optical fiber 8 (in fact, in consideration of losses in the optical fiber 8, solitons of optical power a little greater than these solitons are used).

The length of the transmission path provided by the optical fiber 8 is about 20 km. The optical fiber 8 is a dispersion shift fiber having a transmission loss of about 0.2 dB/km, and is constructed so that, when pulse modulated signal light of a central wavelength of 1.552 µm is incident upon it, its dispersion value is about –0.5 ps/km/nm, while its mode field diameter is about 4 µm.

Now, the above described soliton pulses are distinguished as pulses which are not widened by dispersion due to the optical fiber or the like, and they are pulses which are described by the non linear Schroedinger equation. To consider such soliton pulses, when the solution obtained from the non linear Schroedinger equation is a 1-soliton solution, the form of this soliton does not change as it is transmitted along the optical fiber. Further, when the solution is a 2-soliton solution, although the waveform which is initially incident changes as the pulse is transmitted, nevertheless the waveform repeatedly returns to the incident waveform every time the pulse has been transmitted for a certain distance, so that a periodic waveform change occurs as the soliton pulse is transmitted. And, in the case of 3-soliton pulses or even higher order soliton pulses, in the same way as with 2-soliton pulses, periodic change of waveform occurs as they are transmitted. Thus, if the length of the optical transmission path of the optical fiber etc. is determined upon in consideration of the periods of these higher order soliton pulses (the periods of the higher order soliton pulses are almost equal to one another), then soliton pulses of the same waveforms as the incident soliton pulses will be detected at the output end of the optical transmission path.

Further, when the optical power of the soliton pulses is considered, the power of each soliton pulse is different: if the optical power of a 1-soliton pulse is taken as 1, then the optical power of a 2-soliton pulse is 4, the optical power of a 3-soliton pulse is 9, and in general the optical power of an N-soliton pulse is $N^2$. For this reason, it is possible to tell the various types of soliton pulse apart by detecting the optical powers of the soliton pulses which are received at the signal reception side. Accordingly it becomes possible to transmit a lot of information at very high efficiency, by, for example, performing time division multiplex transmission by assigning corresponding symbols to each order of soliton pulse, and by converting the light received at the signal reception side into different symbols in correspondence to the different optical powers of each order of soliton pulse, and thus performing readout.

Figure 3:
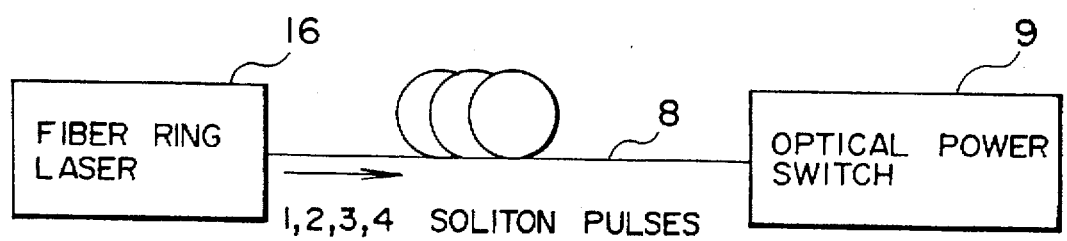
FIG. 3 is an explanatory view showing an exemplary optical signal transmission system using an optical power switch 9 which is an optical power detector according to the above described preferred embodiment of the present invention.

In the system of FIG. 3, the width of the incident pulses may be set to be about 5 ps, and this will make the period of each of the high order (2, 3, and 4) soliton pulses to be about 20 km. Further, the peak power of the 1-soliton pulses, the 2-soliton pulses, the 3-soliton pulses, and the 4-soliton pulses is respectively about 10, 40, 90, and 160 mW.

As shown in FIG. 3, when the soliton pulse modulated signal light from the fiber ring laser 16 which is time division multiplexed into 1-, 2-, 3-, and 4-soliton pulses is incident upon the optical fiber 8, the 1-soliton pulses are transmitted along the optical fiber 8 without their shapes being changed, and are received by the optical power switch 9. Further, although the shapes of the 2-, 3-, and 4-soliton pulses change as these soliton pulses are transmitted along the optical fiber 8, these higher order soliton pulses are received by the optical power switch 9 at a point at which their waveforms have changed back to the same forms as when they were incident, since they have been transmitted along the optical fiber 8 along the transmission path of transmission length of 20 km which corresponds to an integral multiple of the period of the waveform change of these soliton pulses. And when each of the soliton pulses is received by the optical power switch 9, as shown at A in FIG. 1 they are transmitted by the optical fiber 8 so as to be incident upon the saturable absorbers 1, 2, 3, and 4 in order, and at this time the probe light beams from the probe light source 5 is directed along the probe light inwards conduction paths 21a through 24a and is incident upon the soliton pulse signal light so as to cross its path.

Thus, if for example a 1-soliton pulse has passed along the optical fiber 8 to be incident upon the saturable absorber 1, then, since the peak optical power of this 1-soliton pulse is 10 mW, it will saturate the saturable absorber 1 (whose first threshold value A0 is arranged to be 1 mW and whose second threshold value A1 is arranged to be 5 mW) so that this saturable absorber 1 becomes substantially transparent, and therefore the 1-soliton pulse will pass through this saturable absorber 1. Further, at this time, the probe light beam from the probe light source 5 which is directed along the probe light inwards conduction path 21a and is incident upon this saturable absorber 1 will also pass crosswise through it (since it is now saturated and therefore is substantially transparent in all directions), and this probe light therefore will pass along the probe light onwards conduction path 21b and will be incident upon the APD 11.

The 1-soliton pulse which has passed through the saturable absorber 1 then passes further along the optical fiber 8 and is incident upon the saturable absorber 2, but since the first threshold value B0 of this saturable absorber 2 is arranged to be 20 mW, and the peak optical power of this 1-soliton pulse is 10 mW which is less than this first threshold value B0 of the saturable absorber 2, therefore this 1-soliton pulse will not saturate the saturable absorber 2, so that this saturable absorber 2 remains substantially opaque, and therefore the 1-soliton pulse will be absorbed and intercepted by this saturable absorber 2. Further, at this time, the probe light beam from the probe light source 5 which is directed along the probe light inwards conduction path 22a and is incident upon this saturable absorber 2 will also be intercepted by it (since it is not now saturated and therefore is substantially opaque in all directions), and this probe light therefore will not pass along the probe light onwards conduction path 22b and will not be incident upon the APD 12. Similarly, since the 1-soliton pulse is absorbed by the saturable absorber 2 and accordingly no pulse signal light at all will pass therethrough to be incident upon the saturable absorbers 3 and 4, these absorbers 3 and 4 thus will remain unsaturated and opaque, and will therefore intercept the beams of probe light directed upon them via the probe light inwards conduction paths 23a and 24a, so that no probe light will be incident upon the APDs 13 and 14.

Figure 4A:
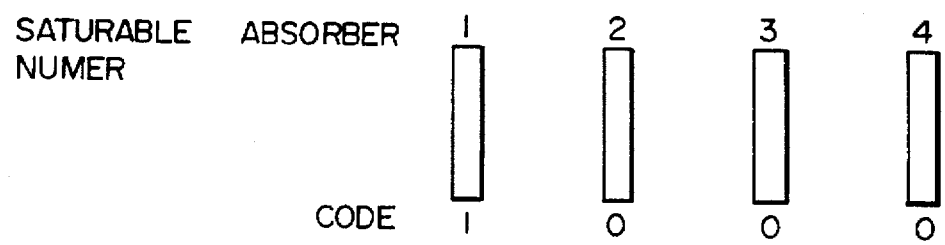
FIGS. 4A and 4B are explanatory figures showing examples of optical intensity readout operation (digital conversion operation) of this optical power detector according to the above described preferred embodiment of the present invention.

In this manner, when a 1-soliton pulse is transmitted along the optical fiber 8 to be incident upon this optical power switch 9, probe light is received by the APD 11, but no probe light is received by the APD 12, the APD 13, or the APD 14. Accordingly, the decoder 6 can detect from the outputs of these APDs 11 through 14 whether each of the saturable absorbers 1, 2, 3, and 4 is saturated or unsaturated (substantially transparent or substantially opaque), and thereby, as shown in FIG. 4A, the binary digit "1" is obtained from the saturable absorber 1 through which the 1-soliton pulse has passed, but on the other hand the binary digits "0" are obtained from the saturable absorbers 2, 3, and 4 through which the 1-soliton pulse has not passed. Thereby it is possible to determine that the optical power of the incident soliton pulse was 1, referred to the previously mentioned relative soliton power scale.

Figure 4B:
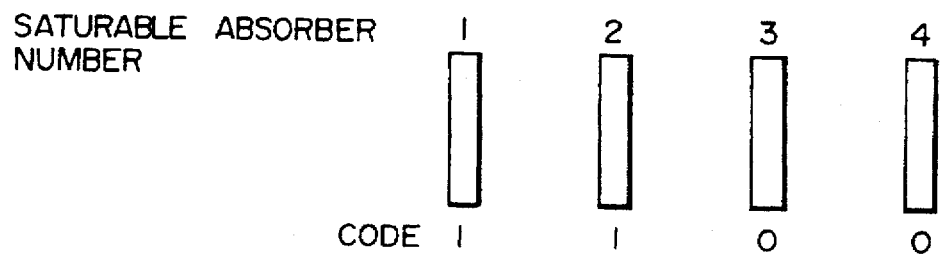

Further, in an analogous manner, when a 2-soliton pulse is transmitted along the optical fiber 8 to be incident upon the saturable absorber 1 of this optical power switch 9, then, since the peak optical power of this 2-soliton pulse is 40 mW, it will saturate the saturable absorber 1 (whose second threshold value A1 is arranged to be 5 mW) so that this saturable absorber 1 becomes substantially transparent, and therefore this 2-soliton pulse will pass through this saturable absorber 1 and will pass further along the optical fiber 8 to be incident upon the saturable absorber 2, and since the second threshold value B1 of this saturable absorber 2 is arranged to be 25 mW which is also less than the peak optical power 40 mW of this 2-soliton pulse, therefore this 2-soliton pulse will also saturate the saturable absorber 2 so that this saturable absorber 2 will also be rendered substantially transparent and will allow this 2-soliton pulse to be transmitted through it towards the next saturable absorber 3. Further, at this time, the probe light beams from the probe light source 5 which are directed along the probe light inwards conduction paths 21a and 22a and which are incident upon these saturable absorbers 1 and 2 will also pass crosswise through them (since they are now saturated and therefore are substantially transparent along all directions), and these probe light beams therefore will pass along the probe light onwards conduction paths 21b and 22b and will be incident upon the APDs 11 and 12. Accordingly, as shown in FIG. 4B, the binary digits "1" are obtained by the decoder 6 from the saturable absorbers 1 and 2 through which the 2-soliton pulse has passed.

Further, the 2-soliton pulse which has passed through the saturable absorbers 1 and 2 then passes further along the optical fiber 8 and is incident upon the third saturable absorber 3 in line, but since the first threshold value C0 of this saturable absorber 3 is arranged to be 60 mW, and the peak optical power of this 2-soliton pulse is 40 mW which is less than this first threshold value C0 of the saturable absorber 3, therefore this 2-soliton pulse will not saturate the saturable absorber 3, so that this saturable absorber 3 remains substantially opaque, and therefore the 2-soliton pulse will be absorbed and intercepted by this saturable absorber 3. Further, the probe light beam which is incident crosswise upon this saturable absorber 3 will also be intercepted by it, and therefore will not be incident upon the APD 13. Similarly, the last saturable absorber 4 also will remain unsaturated and opaque, and will therefore intercept the beam of probe light directed crosswise upon it, so that no probe light will be incident upon the APD 14. Accordingly, as shown in FIG. 4B, the binary digit "0" is obtained by the decoder 6 from the saturable absorbers 3 and 4 through which the 2-soliton pulse does not pass.

Yet further, in an analogous manner, when a 3-soliton pulse or a 4-soliton pulse is transmitted along the optical fiber 8 to be incident upon this optical power switch 9, then the saturable absorbers 1, 2 and 3 will be saturated, and in the case of a 4-soliton pulse (only) the saturable absorber 4 will also be saturated; and binary digits "1" will be obtained from the saturated ones of the saturable absorbers, while a binary digit "0" will be obtained from any unsaturated one thereof. As a result, if a 3-soliton pulse is received by this optical power switch 9, then a digital readout of "1, 1, 1, 0" is read out by the decoder 6; while, on the other hand, if a 4-soliton pulse is received by this optical power switch 9, then a digital readout of "1, 1, 1, 1" is read out by the decoder 6.

In this manner, when a 1-, 2-, 3-, or 4-soliton pulse is received by the optical power switch 9, the optical power of this incoming soliton pulse is transformed into symbolic (digital) form by the operation of the saturable absorbers 1, 2, 3, and 4. As a result, when the digital symbol pattern output from the optical power switch 9 is "1, 0, 0, 0", this means that an optical signal pulse of optical power greater than 5 mW and less than 20 mW is incident, so that it may be determined that a 1-soliton pulse signal, whose peak power is within this intensity range, has arrived. Further, in the same way, when the digital symbol pattern output from the optical power switch 9 is "1, 1, 0, 0", this means that an optical signal pulse of optical power greater than 25 mW and less than 60 mW is incident, so that it may be determined that a 2-soliton pulse signal, whose peak power is in this intensity range, has arrived. In an identical manner, when the digital symbol pattern output is "1, 1, 1, 0", it may be determined that a 3-soliton pulse signal has arrived; and when the digital symbol pattern output is "1, 1, 1, 1" it may be determined that a 4-soliton pulse signal has arrived.

According to the above described operation of this preferred embodiment of the present invention, it is possible to read out from the decoder 6 the optical intensity of the soliton pulse modulated signal light, according to which of the saturable absorbers 1, 2, 3, and 4 this signal light passes through and which thereof it is intercepted by. Due to this, the present invention differs radically from prior art optical signal receivers, such as for example an APD or the like which reads out the intensity of an optical signal according to a threshold level which it has, and the influence received from noise and the like is minimized, so that it becomes possible very accurately to detect and discriminate the intensity of the optical signal.

Further, according to this preferred embodiment, since as for example shown in FIGS. 4A and 4B the intensity of the soliton pulse modulated light signal which is received is instantaneously converted into digital form and is detected as a digital signal intensity, it is possible to perform the detection of optical intensity instantaneously, so that as shown in FIG. 3 the intensity of each pulse of a time division multiplexed soliton pulse modulated light signal is detected instantaneously, and it is possible to determine upon the information contained in the soliton pulse modulated light signal quickly and also accurately.

The present invention is not to be considered as being limited to the above described preferred embodiment thereof; various other embodiments are possible. For example, with the above described preferred embodiment, in order to distinguish between four non-zero levels of soliton pulse (soliton pulses of orders 1 through 4), a total of four saturable absorbers 1, 2, 3, and 4 were provided; but the number of saturable absorbers used for an embodiment of the present invention is not limited to four, but should be set appropriately in view of the number and types of pulses which are to be distinguished.

Further, in the above described preferred embodiment, the threshold levels of the various saturable absorbers 1, 2, 3, and 4 were arranged to be A0=1 mW, A1=5 mW, B0=20 mW, and so on as described above; but the threshold values which are arranged for the various saturable absorbers are not limited to these values used for the above described preferred embodiment: they should be set appropriately in view of the number and types of pulses which are to be distinguished, so as to be able to distinguish between the various pulses of different orders. For this it will be acceptable if the threshold values which are arranged for the saturable absorbers are arranged so as to differ in steps.

Figure 5:
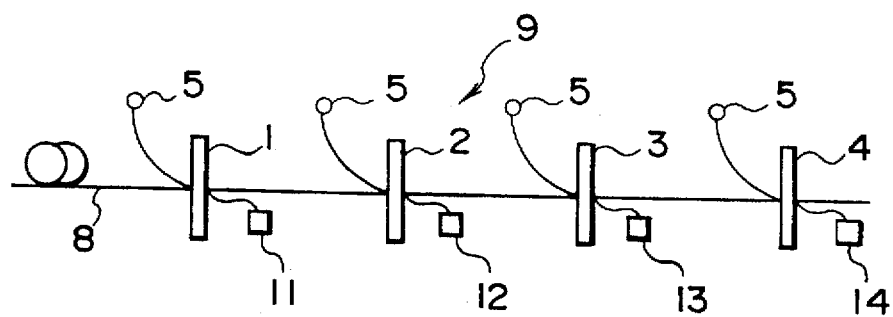
FIG. 5 is an explanatory figure showing an alternative embodiment of the optical power detector according to the present invention.
Figure 6:
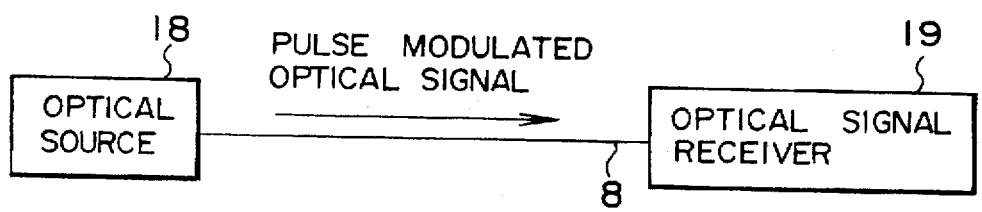
FIG. 6 is an explanatory figure showing an exemplary prior art optical signal transmission system which uses a pulse modulation signal transmission method.

Yet further, in the above described preferred embodiment, the probe light source 5 which was used for providing probe light to illuminate the saturable absorbers 1, 2, 3, and 4 was a single light source, and the probe light generated by this probe light source 5 was divided and then transmitted by the light conduction paths 21a through 24a as four probe light beams which were incident crosswise upon each of the saturable absorbers 1, 2, 3, and 4 respectively; but this is not to be considered as limitative of the concept of the present invention: the alternative arrangement shown in FIG. 5 is possible, in which a plurality of probe light sources 5 are individually provided, one corresponding to each of the saturable absorbers 1, 2, 3, and 4, and each of the saturable absorbers 1, 2, 3, and 4 is illuminated crosswise by its own individual beam of probe light from its own individual probe light source 5. Other variations might also be conceived of. Even further, in the above described preferred embodiment, the fiber ring laser 16 was provided as the light source which illuminated the optical fiber 8 with signal light, and the power of the 1-, 2-, 3-, and 4-soliton pulses generated by the fiber ring laser 16 was detected by the optical power detector. But this is not to be considered as limitative of the concept of the present invention: the optical power detector of the present invention is not necessarily limited to being used for discriminating between 1-, 2-, 3-, and 4-soliton pulses generated by a fiber ring laser. For example, the optical power detector of the present invention may be used as a device for detecting the optical power of 1-, 3-, 6-, and 9-soliton pulses and discriminating between them, or it could be used for detecting the optical power of other types of optical signal and discriminating between them.

Furthermore, in the above described preferred embodiment the transmission path length of the optical fiber 8 was set to be about 20 km, but this is not to be considered as limitative of the concept of the present invention: the transmission path length of the optical fiber 8 may be set as suitable for the particular application, and also various other parameters of the optical fiber 8 such as its dispersion and its mode field diameter may be set as suitable. For example, when a soliton pulse modulated optical signal from a light source such as the fiber ring laser 16 is input into one end of the optical fiber 8 and is detected at the other end thereof by the optical power switch 9, the length of the optical fiber 8 should be set appropriately in correspondence to the pulse width of this incident soliton pulse modulated optical signal, so as to provide a transmission path length which corresponds to the waveform deformation periods of the higher order (>1) soliton pulses.

Yet furthermore, in the above described preferred embodiment, the four avalanche photodiodes (APDs) 11 through 14 were provided as light detection elements, but this is not to be considered as limitative: other optical signal receivers than avalanche photodiodes could be employed for this duty.

Even furthermore, in the above described preferred embodiment, the wave conduction chip 10 was formed around the region in which the saturable absorbers 1, 2, 3, and 4 of the optical fiber 8 were disposed, and the four probe light inward conduction paths 21a through 24a were formed therein for transmitting beams of probe light from the probe light source 5 inwards to each of the saturable absorbers 1, 2, 3, and 4 respectively, with the four light onwards conduction paths 21b through 24b also being formed for transmitting these beams of probe light onwards after having passed through the saturable absorbers 1, 2, 3, and 4 respectively; but this is not to be considered as limitative of the concept of the present invention: it is not necessary to provide a wave conduction chip 10 in the construction of the light power detector which this optical power switch 9 constitutes, and it will be sufficient if the construction is so arranged that, when the transmitted light has passed along the optical transmission path which consists of the optical fiber 8 or the like, and has been directed upon the saturable absorbers 1, 2, 3, and 4 in sequence, the probe light from the probe light source 5 is conducted crosswise and is directed to be incident crosswise upon the saturable absorbers 1, 2, 3, and 4, and so that the probe light which has passed through these saturable absorbers can be received by the APDs 11 through 14.

Moreover, in the above described preferred embodiment, cells of superlattice construction were used as the saturable absorbers, but this is not to be considered as limitative: any devices have the characteristics of saturable absorbers may be used. For example, it is possible to utilize devices which employ substances such as rhodamine or the like, which exhibit saturable absorber characteristics, and which are used in gas laser oscillators.

Accordingly, although the present invention has been shown and described in terms of the preferred embodiment thereof, it is not to be considered as limited by any of the perhaps quite fortuitous details of this embodiment or of the drawings, but only by the terms of the appended claims, which follow.

What I claim is:

1. An optical power detector, comprising:

a light transmission path into an entry end of which a beam of received light is incident;

a plurality of saturable absorbers, each of which has its own pair, differing in steps, of a first threshold value and a second threshold value which is greater than said first threshold value, and is substantially opaque to light of optical intensity below said first threshold value and substantially transparent to light of optical intensity above said second threshold value, disposed in series along said light transmission path;

a probe light source for directing a beam of probe light to be incident upon each of said saturable absorbers in a direction crosswise to said light transmission path for said received light beam, when said received light beam is being transmitted along said light transmission path to be incident upon said saturable absorbers in order;

for each of said plurality of saturable absorbers, a probe light reception section which receives its said probe light beam via said saturable absorber due to said received light beam passing through said saturable absorber, and which does not receive its said probe light beam via said saturable absorber due to said received light beam being absorbed by said saturable absorber;

and an optical power read out means which detects whether or not probe light is received by each of said probe light reception sections which correspond to said saturable absorbers, thereby determines for each one of said plurality of saturable absorbers whether or not said received light beam has passed through it, and thus reads out the optical power of said received light beam.

2. An optical power detector, as defined in claim 1, wherein said probe light source is a single common light source and the light from this common light source is split up to be incident upon each of said plurality of saturable absorbers.

3. An optical power detector, as defined in claim 1, wherein said probe light source consists of a plurality of individual probe light beam sources, one corresponding to each of said plurality of saturable absorbers, each of which independently emits a separate probe light beam which is individually incident upon its corresponding one of said plurality of saturable absorbers.

4. An optical power detector as defined in claim 1, wherein said plurality of saturable absorbers is arranged, in the downstream direction of said transmitted light path from said entry end thereof, stepwise in increasing order of said first and second threshold values.

5. An optical power detector as defined in claim 1, wherein said optical power read out means comprises a digitalization means which converts optical pulses of which said received light beam is composed into symbols, according to the order of arrangement of said plurality of saturable absorbers, by assigning the symbol "1" to those of said plurality of saturable absorbers through which said received light beam passes, and by assigning the symbol "0" to those of said plurality of saturable absorbers through which said received light beam does not pass.

6. A multi-level digital transmission system, comprising:

an optical fiber of length substantially equal to an integral multiple of the waveform deformation period of soliton pulses of order at least two; and:

an optical power detector, comprising:

a light transmission path, an entry end of which is connected to an end of said optical fiber so that light transmitted along said optical fiber is incident upon said entry end as a beam of received light;

a plurality of saturable absorbers, each of which has its own pair, differing in steps, of a first threshold value and a second threshold value which is greater than said first threshold value, and is substantially opaque to light of optical intensity below said first threshold value and substantially transparent to light of optical intensity above said second threshold value, disposed in series along said light transmission path;

a probe light source for directing a beam of probe light to be incident upon each of said saturable absorbers in a direction crosswise to said light transmission path for said received light beam, when said received light beam is being transmitted along said light transmission path to be incident upon said saturable absorbers in order;

for each of said plurality of saturable absorbers, a probe light reception section which receives its said probe light beam via said saturable absorber due to said received light beam passing through said saturable absorber, and which does not receive its said probe light beam via said saturable absorber due to said received light beam being absorbed by said saturable absorber;

and an optical power read out means which detects whether or not probe light is received by each of said probe light reception sections which correspond to said saturable absorbers, thereby determines for each one of said plurality of saturable absorbers whether or not said received light beam has passed through it, and thus reads out the optical power of said received light beam.

7. A multi-level digital transmission system according to claim 6, wherein the light transmitted along said optical fiber consists of a plurality of soliton pulses of different orders, thus constituting a time division multiplexed soliton pulse modulated optical signal.

8. An optical power detector, comprising:

a light transmission path having an entry end for receiving an incident beam of light;

a plurality of saturable absorbers, each of which has a pair of different threshold values, a first threshold value and a second threshold value which is greater than said first threshold value, and is substantially opaque to light of optical intensity below said first threshold value and substantially transparent to light of optical intensity above said second threshold value, disposed in series along said light transmission path;

a probe light source for directing a beam of probe light to be incident upon each of said saturable absorbers in a direction across said light transmission path for said received light beam, when said received light beam is being transmitted along said light transmission path to be incident upon said saturable absorbers in order;

for each of said plurality of saturable absorbers, a probe light reception section for receiving its said probe light beam via said saturable absorber due to said received light beam passing through said saturable absorber, and which does not receive its said probe light beam via said saturable absorber due to said received light beam being absorbed by said saturable absorber;

and an optical detector for detecting whether or not probe light is received by each of said probe light reception sections which correspond to said saturable absorbers, for determining for each one of said plurality of saturable absorbers whether or not said received light beam has passed through it.

* * * * *